A. G. CARLSON.
SLAG DISINTEGRATOR.
APPLICATION FILED MAY 11, 1917.
1,399,848.
Patented Dec. 13, 1921.
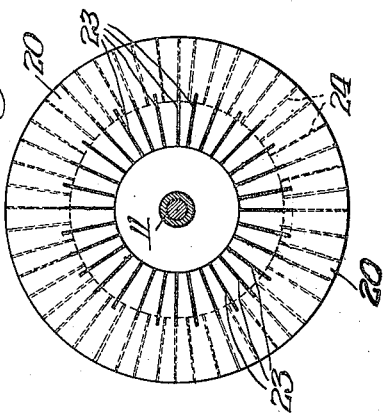
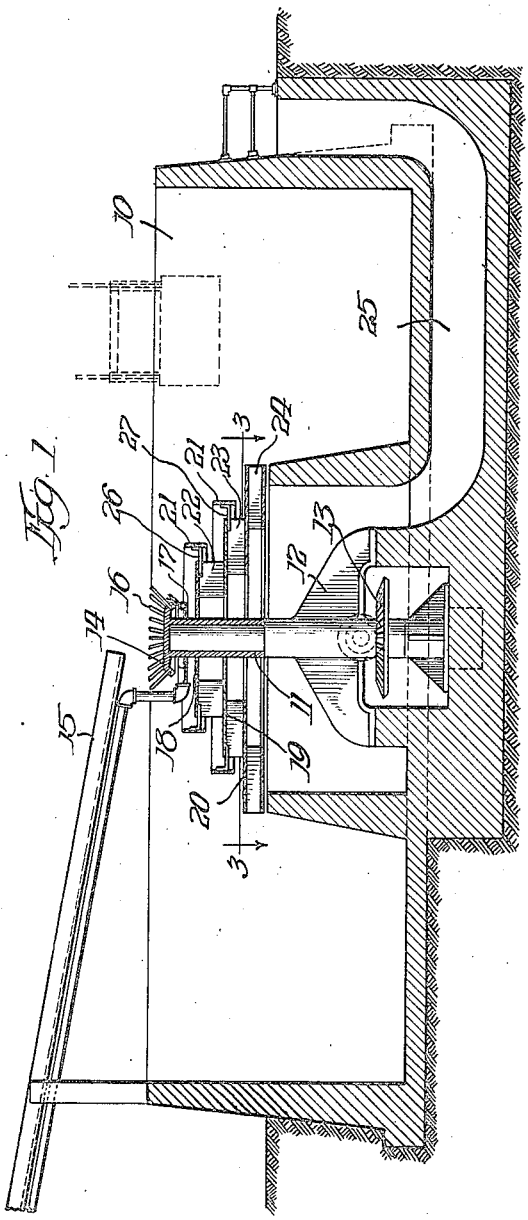
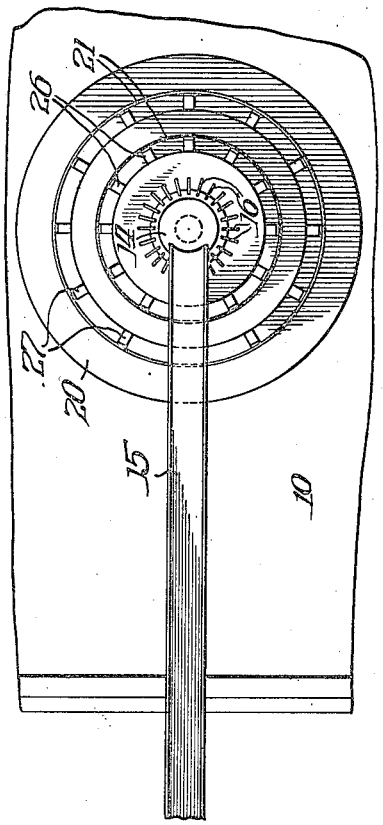
Witnesses:
Inventor
Adolph G Carlson

UNITED STATES PATENT OFFICE.

ADOLPH G. CARLSON, OF CHICAGO, ILLINOIS.

SLAG-DISINTEGRATOR.

1,399,848.  Specification of Letters Patent.  Patented Dec. 13, 1921.

Application filed May 11, 1917. Serial No. 167,940.

*To all whom it may concern:*

Be it known that I, ADOLPH G. CARLSON, a citizen of the United States, and resident of Chicago, in the county of Cook and State of Illinois, have invented certain new and Useful Improvements in a Slag-Disintegrator, of which the following is a specification.

My invention relates to means for disintegrating or granulating molten slag.

An object in the invention is to provide suitable means of the described character which shall effectively disintegrate the molten slag and deliver the same with a minimum of power expenditure. It is well-known that the molten material should be subjected to a blast of air while being cooled. In my preferred arrangement the slag is delivered to a series of rotating disks, the upper of which is provided with a plurality of spaced fingers or projections at its periphery, the lower and successively larger disks being provided with intervening fan blades whereby the material as it descends near the edge of one disk is subjected to a strong blast of air. The arrangement is such that successively larger volumes of air are delivered by the blowers thus formed. The air is admitted from beneath the rotating tables or disks and a plurality of the disks are provided with upstanding marginal flanges, the passages for the material being inside of the flanges near the peripheries of the disks.

The invention will be more readily understood by reference to the accompanying drawings, in which, Figure 1 is a transverse vertical section through a slag disintegrator constructed in accordance with my invention;

Fig. 2 is a plan view thereof, and,

Fig. 3 is a sectional view on the line 3—3 of Fig. 1.

In the drawings it will be seen that the device is situated within a pit 10, the vertical shaft 11 being mounted on a suitable support 12. Bevel gears 13 connect the shaft to a source of power. The upper end of the shaft 11 is surmounted by a horizontal plate 14 to which the slag is delivered through the spout or runner 15. At the periphery of the disk 14 I provide a plurality of spaced fingers or projections 16. Beneath the upper plate I provide a spray ring 17 to which water is constantly supplied and through which the slag must pass in its descent. Also secured to the shaft 11 are plates or tables 18—19—20 of successively larger diameters, the plates 18—19 being provided with upstanding marginal flanges 21. Fan blades 22—23—24 are arranged beneath the plates 18—19—20 respectively, the space beneath the plates being open to provide for the entrance of air through the conduit 25. The fan blades are so arranged that successively larger volumes of air are forced horizontally outward. It will be noted that open spaces 26—27 are provided near the peripheries of the plates 18—19 and adjacent the flanges 21. As the slag is discharged through the beaters 16 it falls on the next lower plate thence through the openings on to the next lower plate. It is, therefore, compelled to pass through the blast of air and be thereby suitably granulated. It will be seen that the mechanism is very simple and that the slag will be successfully granulated without the use of elaborate mechanism.

The construction is capable of modifications and I, therefore, do not wish to be limited except as indicated in the appended claims.

I claim:

1. A slag disintegrator, in combination a vertically supported shaft, a plate mounted on the upper end of said shaft, a series of disks on said shaft below said plate of increasing diameter downwardly, said disks having marginal flanges, and being provided with apertures near said flanges, fan blades between adjacent disks and movable therewith, a conduit leading from the atmosphere to said fans, means for delivering slag to said plate, and means for rotating said shaft.

2. A slag disintegrator comprising a vertically extending shaft, a slag receiving plate upon the upper end of said shaft, a plurality of successively larger plates spaced below said receiving plate, and vertically extending marginal flanges carried by the intermediate plates spaced from their peripheries whereby slag passing to said plates from the receiving plate will be directed successively to the several plates.

3. A slag disintegrator comprising a vertically extending shaft, a slag receiving plate upon the upper end of said shaft, a series of angularly disposed fingers carried by the periphery of said plate and adapted to disintegrate slag carried therefrom by centrifugal force, a plurality of successively larger plates spaced below said receiving plate, and vertically extending marginal flanges carried by the intermediate plates spaced form their peripheries whereby slag passing to said plates from the receiving plate will be directed successively to the several plates, and vertically disposed flanges between successive plates adapted to direct a blast of air against slag directed downwardly by the said flanges.

4. An improvement in the art of disintegrating slag which consists in delivering molten slag onto a whirling plate having stepped horizontally disposed surfaces onto which the slag is successively delivered, and subjecting the slag to horizontally directed air blasts created by the rotation of said plate as the slag is discharged from one plate onto the next lower plate, and which air blasts are of increasing volume in the direction of flow of the slag.

5. An improvement in the art of disintegrating slag which consists in delivering molten slag onto a whirling plate having marginal flanges to prevent a too rapid discharge of the slag therefrom, said plate having peripheral openings overlying a second plate similar to the first but of greater diameter, and a third plate underlying the second plate but having no marginal flanges, the several plates being separated one above another by vertically disposed radially extending webs which latter serve to create air blasts as said stepped plates are rotated, whereby the slag may be subjected to horizontal air blasts as the slag falls from one plate to another.

6. An improvement in the art of disintegrating slag which consists in delivering molten slag onto a whirling plate, which plate includes a plurality of horizontally disposed tables of increasing diameter downwardly, some of said tables having upstanding marginal flanges and provided with openings near the peripheries thereof whereby the discharge from one table will fall onto the next lower table, and means for creating horizontally disposed air blasts whereby the slag may be subjected thereto as the same falls from one table to the other, said air blasts being of increasing volume in the direction of flow of the slag.

Signed at Chicago, Illinois, this 3rd day of May, A. D. 1917.

ADOLPH G. CARLSON.

Witnesses:
N. E. CRULL,
W. J. McRAE.